(No Model.)

J. GALLEGOS.
DEVICE FOR TEACHING SPELLING.

No. 502,183. Patented July 25, 1893.

WITNESSES:
F. M. Ardle
C. Sedgwick

INVENTOR
J. Gallegos
BY
Munn & Co
ATTORNEYS.

UNITED STATES PATENT OFFICE.

JOSÉ GALLEGOS, OF OCÓS, GUATEMALA.

DEVICE FOR TEACHING SPELLING.

SPECIFICATION forming part of Letters Patent No. 502,183, dated July 25, 1893.

Application filed December 1, 1892. Serial No. 453,759. (No model.)

*To all whom it may concern:*

Be it known that I, JOSÉ GALLEGOS, of Ocós, Guatemala, Central America, have invented a new and Improved Device for Teaching Spelling, of which the following is a full, clear, and exact description.

My invention relates to improvements in educational appliances, and especially to such as are adapted for use in teaching young people how to spell and teaching them the use and significance of numbers.

It is well known that children learn to spell long words very quickly if the syllables of the words are presented to them successively, and in a similar way they learn the use and significance of numbers and how to read numbers if the numbers are presented to them in periods or added one at a time.

The object of my invention is to produce a cheap and simple device which may be easily carried in the pocket, and which may be applied to words or numbers upon a book or any other surface so as to cover a portion of the words or numbers and expose other portions so that the word or number, as the case may be, to which the device is applied may be divided up into suitable periods and the relation of the syllables and letters to each other and of the figures of the numbers to each other easily taught and understood.

To these ends my invention consists in a device for teaching spelling, which will be hereinafter described and claimed.

Reference is to be had to the accompanying drawings forming a part of this specification, in which similar figures of reference indicate corresponding parts in all the views.

Figure 1:
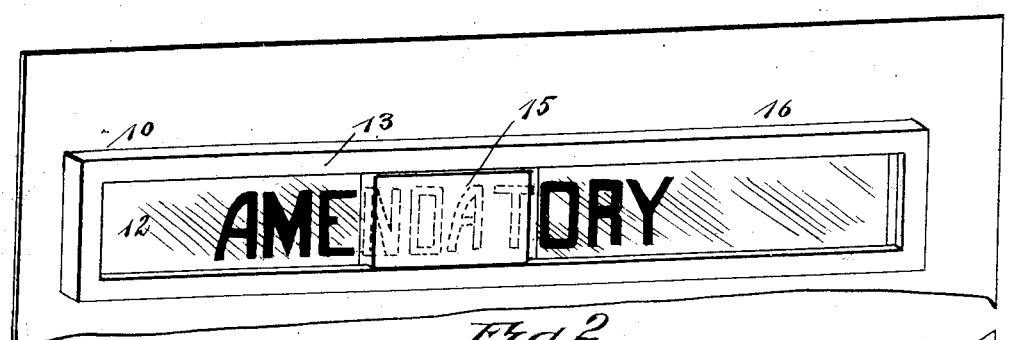
Figure 2:
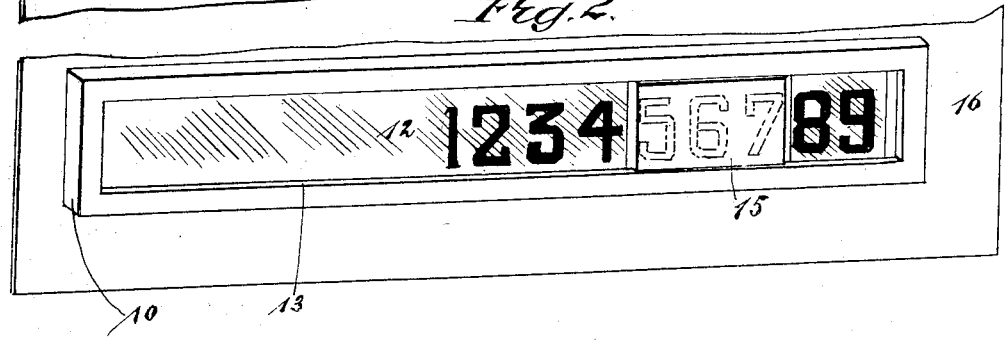
Figure 3:
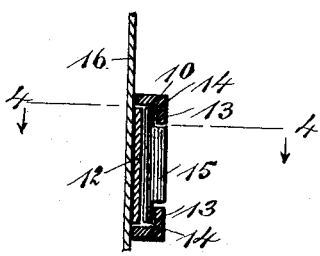

Figure 1 is a perspective view of the device embodying my invention, showing it applied to a word. Fig. 2 is a similar view but with the device applied to a large number. Fig. 3 is a cross section of the appliance in position upon a card; and Fig. 4 is a longitudinal section of the device on the line 4—4 in Fig. 3.

Figure 4:

The device embodying my invention has an elongated rectangular frame 10 which is made small and light, so that it may be conveniently carried in the pocket, and this frame is open on top and is shouldered at the ends and on the back sides, as shown at 11, in Fig. 4, so as to permit a glass 12 to be inserted in the frame and held upon the shoulders in such a way as to have its outer face flush with the back of the frame. The top or outer portion of the frame juts inward parallel with the plane of the glass, as shown at 13, and this construction enables the wings 14 of a slide block 15 to be held between the upper flange 13 of the frame and the glass, while the block 15 may slide upon the opposite flange 13. The block 15 is adapted to be moved by the fingers and its size is such that it will cover at least a syllable of an ordinary word. The size of the block is not very material, however, and its size may be varied to suit the purposes to which it is applied.

The device is used in the following way: It is laid upon a sheet 16, on which the printed matter occurs, and if a long word is to be spelled out by syllables or letters, the word is partially covered and the slide block slipped from letter to letter or syllable to syllable, as the case may be. In Fig. 1, the block 15 is shown as partially covering the word "amendatory" and the block has been pushed letter by letter until the letter "e" is exposed, by sliding it a little farther, the letter "n" will be exposed, and in this manner the word may be presented to the pupil letter by letter so that the manner of producing or spelling the word will become fixed in the child's mind.

Fig. 2 shows the application of the device to a large number, but it is used in the same way except that if the manner of arranging the numbers to count consecutively is to be taught, the block is moved from left to right, and if the arrangement of the numbers in periods is to be taught, the block is slipped from right to left.

Having thus described my invention, I claim as new and desire to secure by Letters Patent—

1. A device of the character described, comprising an open frame adapted to be placed over printed or other matter, and provided on its upper side on opposite sides of the opening with inwardly projecting flanges, and a sliding block provided with wings extending beneath the flanges of the frame, and adapted to be moved back and forth in the opening of the frame to cover one or more of the characters showing through said opening, substantially as described.

2. A device of the character described, comprising a flat elongated frame having a central opening adapted to be arranged over a word or number, a glass arranged to cover the back of the frame, inwardly extending flanges on the upper side of the frame and on opposite sides of the opening, and a slide block held in the open portion of the frame with wings extending beneath the flanges, substantially as described.

JOSÉ GALLEGOS.

Witnesses:
EDMUNDS R. CUTHBERT,
EUGENE HOFFMAN.